United States Patent
Peljto

(10) Patent No.: US 7,299,212 B2
(45) Date of Patent: Nov. 20, 2007

(54) SECURITY CONSTRAINED OPTIMAL DISPATCH FOR LOAD PREDICTION FOR ELECTRICITY MARKETS

(75) Inventor: Haso Peljto, Brooklyn Park, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 868 days.

(21) Appl. No.: 10/385,223

(22) Filed: Mar. 10, 2003

(65) Prior Publication Data
US 2004/0019573 A1 Jan. 29, 2004

Related U.S. Application Data

(60) Provisional application No. 60/363,373, filed on Mar. 11, 2002.

(51) Int. Cl.
G06F 17/00 (2006.01)
G06Q 40/00 (2006.01)
(52) U.S. Cl. ........................................ 705/412; 705/37
(58) Field of Classification Search .................. 705/37, 705/412, 1, 7, 8, 10, 26, 27; 700/286, 291
See application file for complete search history.

(56) References Cited

U.S. PATENT DOCUMENTS 3,903,402 A * 9/1975 Petit et al. ..................... 700/6
7,099,839 B2 * 8/2006 Madoff et al. ................ 705/37
2002/0165816 A1 * 11/2002 Barz ............................ 705/37
2003/0055776 A1 * 3/2003 Samuelson ................... 705/37
2004/0215348 A1 * 10/2004 Ilic et al. ....................... 700/1

FOREIGN PATENT DOCUMENTS

WO WO 02/103465 A2 * 12/2002

OTHER PUBLICATIONS

The Investment FAQ (part 19 or 20); 1997-2003.*

* cited by examiner

Primary Examiner—Igor N. Borissov

(57) ABSTRACT

The present invention is an apparatus for optimizing security constrained dispatch and pricing for the wholesale energy trading market. The imbalance market uniquely requires a real-time market for bidding and for providing the energy generation adjustments required to satisfy the imbalance. The present invention address the above noted needs by providing a real-time imbalance engine to support and implement the equitable imbalance requirement via a computer system implementation. Additionally, the present invention allows the market generators and loads to provide electronic bids for resolution while considering constraints on the demand and supply system.

11 Claims, 1 Drawing Sheet

SECURITY CONSTRAINED OPTIMAL DISPATCH FOR LOAD PREDICTION FOR ELECTRICITY MARKETS

CROSS-REFERENCE TO RELATED APPLICATIONS

This application claims the benefit under 35 U.S.C. § 119(e) of U.S. Provisional Application No. 60/363,373 filed on Mar. 11, 2002 which is herein incorporated by reference.

TECHNICAL FIELD

This invention relates generally to the electronic optimization management of wholesale electricity markets. In particular, the invention pertains to the optimization of security constrained dispatch resources for regional wholesale energy markets.

BACKGROUND ART

This invention relates generally to a method of generating the energy required to provide energy and ancillary services to certain regions based on the availability of the generating resources within Regional Transmission Organizations. In particular, the invention pertains to generating and resolving energy imbalance requirements for Regional Transmission Organizations, Independent System Operators, and Independent Transmission Providers.

A brief description of how the energy imbalance market functions, as required by the Federal Energy Regulatory Commission ("FERC") regulations, may be helpful in understanding the field of the present invention. In April 1996, FERC Order 888, "Promoting Wholesale Competition Through Open Access Nondiscriminatory Transmission Services by Public Utilities," required jurisdictional public utilities to file open access transmission tariffs to allow competition in the supply of wholesale electrical energy. Under the Order 888 market entities (utilities, merchant generators, energy traders, etc) compete to provide energy based on several factors including cost and availability of transfer capacity on transmission facilities. Market entities can be limited from providing energy to certain regions based on the availability of transfer capacity on transmission facilities.

According to the framework established by Order 888, provision of energy to resolve imbalances in the actual production of energy versus scheduled energy was the responsibility of the Transmission Provider and was covered as part of the Open Access Tariff. The Transmission Provider usually satisfied this requirement without a market mechanism by self-generating the required energy and ancillary services.

In December 1999, FERC issued Order 2000, "Regional Transmission Organizations." This order required jurisdictional public utilities to form and participate in a Regional Transmission Organization ("RTO"). The operational control of generators, and transmission facilities was assigned to the Regional Transmission Organization. Under FERC regulations, RTOs are required, among other things, to ensure that its transmission customers have access to an energy and ancillary services market. An RTO may cover parts of one or more states within the United States. RTOs are required to maintain efficient traffic grid management, to improve grid reliability, to monitor and mitigate against opportunities for discriminatory transmission practices, and to improve competition in the wholesale electricity markets. The RTO is expected to administer the open access transmission tariff, to exercise operational control over, congestion management, reliability and to plan the expansion of its transmission system. An additional set of requirements for RTOs are that they remain independent of the market participants.

In the framework of FERC Order 2000, the RTO is responsible for providing transmission customers with access to an energy market. Several market operators met the requirements of this order by redispatching all energy in a real time market, followed by financial settlement of energy imbalances. The requirements of this order can also be met by the imbalance engine described below.

In July 2002, FERC issued a Notice of Proposed Rulemaking (NOPR), "Remedying Undue Discrimination through Open Access Transmission Service and Standard Electricity Market Design." This NOPR announces FERC's intent to form a standard market design for wholesale electrical energy. This NOPR requires public utilities to place their transmission assets that are used in interstate commerce under the control of an Independent Transmission Provider or ITP. Among other functions, an ITP is responsible for operating a day ahead market and a real time market for balancing energy.

In the day ahead market, spot market prices are generally determined based on offers to supply energy and on forecast requirements for load. A supply curve is determined using either marginal costs or bid prices to rank order the plants beginning with the cheapest plants. However, the FERC NOPR recognizes that to create a truly competitive wholesale power market, the market must also allow for price responsive loads.

In this framework, the market operator receives pricing information from various wholesale market generators (typically coal-fired power plants, hydroelectric power plants, nuclear power plants, etc.) and receives energy requirements information from the Load Serving Entities The market operator is then responsible for determining an operating plan based on the offers provided by the various market generators and the bids provided by the various Load Serving Entities in the most cost effective manner.

Presently, all generators provide schedule information to control area operators in the form of a statement of quantity of energy they plan to generate and the time at which the energy will be generated. The amount of energy may vary over the course of a day, changing typically in hourly increments based on a variety of factors. Under the framework of Order 2000 and the FERC NOPR, market participants may voluntarily offer to supply additional energy beyond the predetermined scheduled amount or alternatively to reduced the energy supplied below the previously scheduled amounts so that the RTO satisfy real time balancing requirements. Additional energy costs arise when the market generator is requested to meet a real-time and unanticipated shortage of energy. Additionally, reduced energy costs may arise when the market generator is requested to provide less energy than previously contracted for in order to meet an unanticipated glut of energy.

Computer systems within an RTO (Regional Transmission Organization, Independent System Operator, or Independent Transmission Provider) generate an daily operating plan that determines for each time increment for the following day how much energy will be supplied by each generator. The energy needs are forecast for each day based on known statistical methods of forecasting electrical demand. The forecast is typically accurate but is seldom one hundred percent accurate as to the energy demands for a certain region. Accordingly, as the energy plan from the previous day is carried out by the RTO, the energy demands are not one hundred percent accurate. More or less energy is actually needed than that which was in the energy plan, and there may be deficiencies in the amounts of energy actually supplied by generators due to forced or unplanned outages for maintenance. This variance in energy requirements is referred to as imbalance energy or balancing energy requirements The RTO computer system addresses that imbalance by using the bid and offer information received from market participants.

The RTO is required by the FERC Order 2000 to implement an energy imbalance market. The imbalance market requires a real-time market for bidding to provide energy generation and load adjustments to satisfy the imbalance. Therefore, instead of relying on contracted prices generated one or more days in advance, a method must be provided to allow market generators and loads to bid for adjustments (for example, by providing more or less energy) in a real-time manner during the day in real time as the energy imbalance occurs.

However, additional optimization tools are necessary for market clearing and commodity pricing based on security constrained dispatch. The security constrained dispatch considers the overall efficiency of the electricity markets subject to additional requirements. The additional requirements include transmission constraints and resource characteristics.

The imbalance market uniquely requires a real-time market for bidding and for providing the energy generation adjustments required to satisfy the imbalance. The present invention address the above noted needs by providing a real-time imbalance engine to support and implement the equitable imbalance requirement via a computer system implementation. The imbalance engine enables the RTO to operate a load following scheme to implement the FERC 2000 and NOPR requirements for implementation of an equitable energy imbalance market. The imbalance market mechanism assures a means other than the use of dedicated regulation and reserve resources or bilateral contract markets to balance load and generation. Additionally, the present invention allows the market generators and loads to provide electronic bids for resolution by the imbalance engine.

SUMMARY OF THE INVENTION

According to one aspect of the invention, there is provided a computer implemented system for optimal market dispatch for clearance and pricing of energy in an energy trading market spanning control areas of at least one market participant, said system comprising: means for inputting transmission security constraints of said at least one market participant; means for clearing energy bids across said control areas; means for optimizing the dispatch of energy considering said transmission security constraints of said at least one market participant; and means for pricing the dispatch of energy considering said transmission security constraints.

BRIEF DESCRIPTION OF THE FIGURES

The present invention will now be described with reference to the accompanying drawings wherein.

DETAILED DESCRIPTION OF THE FIGURES

Figure 1:
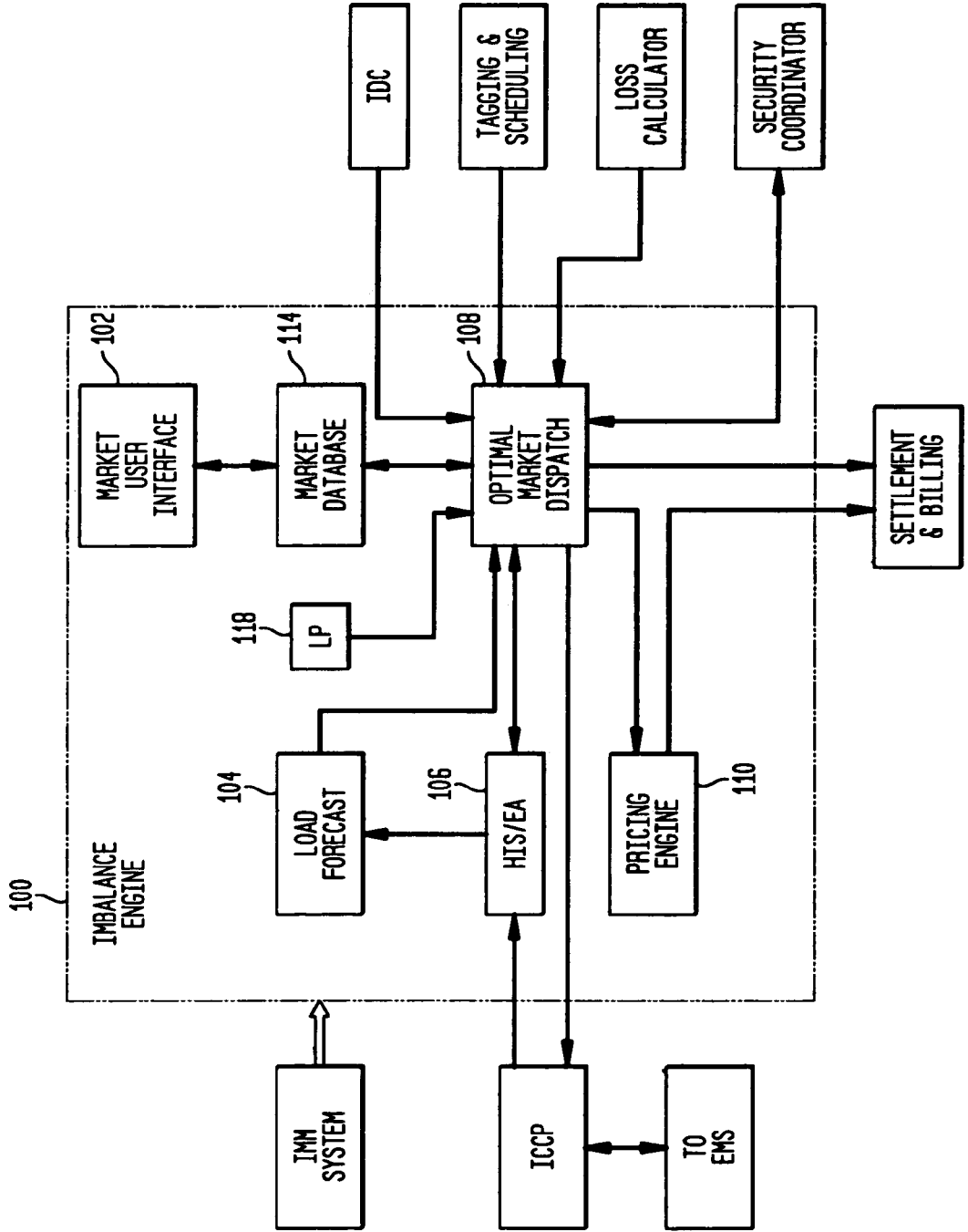
FIG. 1 is a schematic diagram of the system in accordance with the principles of the present invention.

To illustrate the principles of the present invention, a real-time imbalance engine and co-optimization engine as developed by Siemens Power Transmission & Distribution, Inc., the assignee of the present invention, shall be described in detail. While this engine constitutes a preferred embodiment of the invention, it is not the intention of applicants to limit the scope of the invention to the particular details of this engine. Rather, it is the intention of the applicants that the invention be defined by the appended claims and all equivalents thereto.

Referring to FIG. 1, there is shown an exemplary block diagram of the components and interfaces of an imbalance and co-optimization engine 100 in accordance with the principles of the present invention. The imbalance engine 100 consists generally of a market user interface 102, an energy imbalance forecast engine 104, a component for handling energy measurements processing, archiving and accounting 106, a market optimal dispatch 108, a component for balancing energy pricing 110, and a market database 114. A load prediction engine 118 is alos included for predicting the load demands on the energy dispatch system.

The real-time mechanism serve to assure means to balance the load and generation of allowing for load following and other ancillary services. Therefore, the performance is controlled in an optimal manner at the same time as controlling network congestion and transmission losses. The final result is that the real time market co-optimization provides the efficiency of energy delivery and the regulation capability and the reserve availability and provides the key coordination for the control areas in an equitable manner.

The real time market mechanism is designed as an optimization tool for market clearance and commodity pricing based on least cost security constrained dispatch. The market clearing process presents the bid-based maximization of economic efficiency of the overall wholesale electricity market subject to system requirements, transmission constraints and resource management characteristics. Co-optimization allows for the simultaneous optimization, along with the real-time clearance and commodity pricing, to take place with respect to multiple market commodities such as balancing energy, regulation capacity, and spinning reserve.

The optimization occurs across an internal hierarchical order of components in the wholesale energy market: first the control areas, then the reserve regions, generation zones, and finally the load zones.

Other factors to be considered for co-optimization are discussed below:

Network Losses

Energy network losses are considered using incremental loss sensitivity factors. They present the influence of power injections and withdrawals to network losses at each network node.

Transmission Congestion

Transmission congestion is relieved with minimal market operational costs. Transmission constraints are specified using a DC network model as incremental approximation around the base point. Transmission line flows are limited in both directions, Eventual network congestion differentiate locational marginal prices in the way giving optimal market incentives from both an operational and investment point of view.

Resource Constraints

Both resource capacity and inertia constraints are considered as essential requirements for physical system operations. Each resource can be considered a ramping constraint over the considered time horizon.

Locational Marginal Pricing

Locational Marginal Pricing is the price based on marginal operational costs for each market product. For regulation capacities, locational marginal prices refer to the control area locations, while for spinning reserve locational marginal prices, reference is made back to the reserve region locations. Locational marginal prices are calculated for each network node to support pricing of both market participants and market non-participants. These nodal balancing energy prices include network losses and eventual transmission congestion.

It will be understood that other constraints on generation and dispatch of energy may similarly be used in calculating the optimal dispatch.

Market clearance and locational marginal pricing using security constrained economic dispatch is described herein. The objective is to balance load and generation and produce a bid-based least-cost optimized dispatch for energy and ancillary services. The constraints may include (1) system requirements for energy, (2) control area requirements for regulation, (3) regional requirements for reserve energy, (4) transmission line capacities, (5) network losses, (6) ramp rate limits, (7) resource capacity limits. The constraints are factored into producing an optimal dispatch which provides for clearance, locational marginal pricing and network congestion management.

The optimization objective can be characterized as the least cost security constrained dispatch for energy and other ancillary services. The optimization objective from a generator perspective can be characterized as minimizing the total bid costs by considering the benefits of energy consumption while discounting the costs of energy generation, the costs of Up regulation, the costs of down regulation, the costs of unit spinning reserve, and the costs of load spinning reserve. Mathematically, the constraining factors for total bid costs are characterized as follows:

The benefits of energy consumption:

$$\sum_{t \in T} \sum_{load \in L} D_{En}^t(En_{load}^t)$$

where $$D_{En}^t$$

is the operating cost function of the load energy consumption at time interval t; and $$En_{load}^t$$

is the load energy consumption at time interval t

The costs of energy consumption can be characterized mathematically as follows $$\sum_{t \in T} \sum_{unit \in G} C_{En}^t(En_{unit}^t)$$

where $$C_{En}^t$$

is the operating cost function of the unit energy generation at time interval $$En_{unit}^t$$

is the unit energy generation at time interval t.

The costs of up regulation of energy is mathematically as follows:

$$\sum_{t \in T} \sum_{unit \in G} C_{Reg}^{Up;t}(Reg_{unit}^{Up;t})$$

where $$C_{Reg}^{Up;t}$$

the operating cost function of the up regulation costs at time interval t;

$$Reg_{unit}^t$$

is the unit up regulation capacity at time interval t.

The costs of down regulation of energy is mathematically as follows:

$$\sum_{t \in T} \sum_{unit \in G} C_{Reg}^{Dn;t}(Reg_{unit}^{Dn;t})$$

where $$C_{Reg}^{Dn;t}$$

is the operating cost function of the down regulation costs at time interval t;

$$Reg_{unit}^t$$

is the unit down regulation capacity at time interval t.

The costs of unit spinning reserve is represented mathematically as follows:

$$\sum_{t \in T} \sum_{unit \in G} C_{Res}^{t}(Res_{unit}^{t})$$

where $$C_{Res}^{t}$$

is the operating cost function of the spinning reserve costs at time interval $$Res_{unit}^{t}$$

is the unit spinning reserve at time interval t.

The costs of load spinning reserve are represented mathematically as follows:

$$\sum_{t \in T} \sum_{load \in L} C_{Res}^{t}(Res_{load}^{t})$$

where $$C_{Res}^{t}$$

is the operating cost function of the spinning reserve costs at time interval $$Res_{load}^{t}$$

is the load spinning reserve at time interval t.

The optimization objective is to minimize the total costs of these operating cost functions subject to the system requirements for energy balance and control area regulation. These system requirements are characterized as follows:

Energy balance must be optimized or maintained.

$$\sum_{unit \in G} \frac{En_{unit}^{t}}{pf_{unit}} - \sum_{load \in L} \frac{En_{load}^{t}}{pf_{load}} = En_{native}^{t} \quad t \in T$$

while the following control area regulation are maintained at all times:

$$\sum_{unit \in CA} Reg_{unit}^{Up;t} \geq Reg_{CAreq}^{Up;t} \quad t \in T$$

and $$\sum_{unit \in CA} Reg_{unit}^{Dn;t} \geq Reg_{CAreq}^{Dn;t} \quad t \in T$$

The regulation reserve requirements must also be maintained:

$$\sum_{unit \in RR} Res_{unit}^{t} - \sum_{load \in RR} Res_{load}^{t} \geq Res_{RRreq}^{t} \quad t \in T$$

The DC transmission line constraints must additionally be maintained. The transmission line constraints are represented by:

$$Pow_{line}^{t} = Pow_{line}^{base} + \sum_{unit \in G} SF_{line;unit} \cdot (En_{unit}^{t} - En_{unit}^{base}) - \sum_{load \in L} SF_{line;load} \cdot (En_{load}^{t} - En_{load}^{base})$$

where $$Pow_{line}^{base}$$

is the line base flow

The total line flow limits must then be within a range of line flow limits.

Another auxiliary constraint is the ramp rate constraints on generation and load limits as defined by:

$$RR_{unit}^{Dn} \leq En_{unit}^{t} - En_{unit}^{t-1} \leq RR_{unit}^{Up} \quad unit \in G; t \in T$$

$$RR_{load}^{Dn} \leq En_{load}^{t} - En_{load}^{t-1} \leq RR_{load}^{Up} \quad load \in L; t \in T$$

Additionally, there are resource capacity constraints imposed for security constrained dispatch. These constraints are formulated below:

The unit energy limit is bounded in the following manner:

$$\underline{En_{unit}^{t}} \leq En_{unit}^{t} \leq \overline{En_{unit}^{t}} \quad unit \in G; t \in T$$

The load energy limit is bound in the following manner:

$$\underline{En_{load}^{t}} \leq En_{load}^{t} \leq \overline{En_{load}^{t}} \quad load \in L; t \in T$$

The unit regulation availability is bounded in the following manner:

$$0 \leq Reg_{unit}^{Up;t} \leq \overline{Reg_{unit}^{Up;t}} \quad unit \in G; t \in T$$

and

-continued $$0 \le Reg_{unit}^{Dn;t} \le \overline{Reg_{unit}^{Dn;t}} \quad unit \in G; t \in T$$

The unit regulation range is bounded in the following manner:

$$En_{unit}^{t} + Reg_{unit}^{Up;t} \le \overline{Reg_{unit}^{t}} \quad unit \in G; t \in T$$

and $$\underline{Reg_{unit}^{t}} \le En_{unit}^{t} - Reg_{unit}^{Dn;t} \quad unit \in G; t \in T$$

The unit spinning reserve limit is constrained in the following manner:

$$0 \le Res_{unit}^{t} \le \overline{Res_{unit}^{t}} \quad unit \in G; t \in T$$

The load spinning reserve limit is constrained in the following manner:

$$0 \le Res_{load}^{t} \le \overline{Res_{load}^{t}} \quad load \in L; t \in T$$

The unit capacity limits are constrained in the following manner:

$$En_{unit}^{t} + Reg_{unit}^{Up;t} + Res_{unit}^{t} \le \overline{En_{unit}^{t}} \quad unit \in G; t \in T$$

and $$\underline{En_{unit}} \le En_{unit}^{t} - Reg_{unit}^{Dn;t} \quad unit \in G; t \in T$$

The load capacity limit is constrained in the following manner:

$$\underline{En_{load}^{t}} \le En_{load}^{t} - Res_{load}^{t} \quad load \in L; t \in T$$

The imbalance market clearing process is based on non-linear Dantzig-Wolfe decomposition supported by the revised simplex method. Dantzig-Wolfe is a decomposition algorithm for linear programming solutions. The decomposition of the market dispatch problem results in the master problem related to overall imbalance market optimization, and a set of sub-problems related to the individual market participant optimizations.

To solve the master problem, the revised simplex method is employed. The results provide optimal market clearing prices based on sub-problem solutions found in previous iterations. These prices are passed to the sub-problems as market coordination signals. The new set of sub-problems are solved and the solutions are returned back to the master problem. These responses are compared to the market requirements for Inc and Dec energy and ancillary services requirements. Any imbalance causes updates for market prices leading to supply/demand balance for each market product.

Market participant optimization provides its best response to posted market prices. These sub-problems present a multiple product co-optimization from a single market participant's point of view. The sub-problems absorb all economic and physical characteristics specific to each market participant.

In accordance to the Dantzig-Wolfe approach, optimality must be improved at each iteration. Otherwise, the optimal solution of the market dispatch problem has been achieved. Tied bids will be dispatched pro rata, i.e. proportionally to the length of tied bid MW segments. The pro rata bids will be dispatched to the market participant The optimal results include both market clearing prices and optimal balancing energy set points for each market participant. The optimal results consist of the desired 5-minute average values that are expected to be implemented in the future time. The implementation of the imbalance market dispatch results will be supported by standard ramping rules applied in accordance to market participant dynamics. Ramping will start 1 minute before the start of the operational 5-minute interval. This ramping rule will provide balancing energy service as it is dispatched by the imbalance market.

The above described embodiments are merely exemplary. Those of ordinary skill in the art may readily devise their own implementations that incorporate the principles of the present invention and fall within the spirit and scope thereof.

What is claimed is:

1. A computer implemented system for optimal dispatch of energy generation and energy load in an energy imbalance market of an energy distribution system separate from a bilateral energy trading market and a dedicated regulation function of the energy distribution system, the energy distribution system including an energy distribution region subdivided into a plurality of different control areas including imbalance market participants, the system comprising:

means for receiving from a plurality of imbalance market participants, including energy generation participants and energy consuming load participants in an energy distribution region, energy supply and energy demand requirements for imbalance energy in an energy imbalance market;

means for determining optimal dispatch of energy generation and energy load for each imbalance market participant for balancing generation and load imbalances in the imbalance market responsive to security constraints of at least one imbalance market participant, wherein determining optimal dispatch is based on a direct current line transmission security constraint according to the relationship:

$$Pow_{line}^{base} + \sum_{unit \in G} SF_{line;\ unit} \cdot (En_{unit}^{t} - En_{unit}^{base}) - \sum_{load \in L} SF_{line;\ load} \cdot (En_{load}^{t} - En_{load}^{base}),$$

wherein $$Pow_{line}^{base}$$

is a power line base flow, unit is one of a group of energy generators G, $SF_{line;unit}$ is a shift factor for the unit on the line, $En_{unit}^t$ is the unit energy for time interval t, $En_{unit}^{base}$ is the unit base energy, load is one of a group of energy loads L, $SF_{line;load}$ is a shift factor for the load on the line, $En_{load}^t$ is the load energy for the time interval t, and $En_{load}^{base}$ is the load base energy; and means for generating balancing dispatch instructions responsive to the determined optimal dispatch of energy generation and energy load for each imbalance market participant for use in controlling their respective energy generation and energy load to remedy energy generation and energy load imbalances in the imbalance market other than the use of a bilateral energy trading market and a dedicated regulation function of the energy distribution system.

2. The system of claim 1, wherein said constraint is a market participant energy limit.

3. The system of claim 1, wherein said constraint is a load energy limit.

4. The system of claim 1, wherein said constraint is a market participant regulation availability.

5. The system of claim 1, wherein said constraint is a market participant regulation range.

6. The system of claim 1, wherein said constraint is a market participant spinning reserve limit.

7. The system of claim 1, wherein said constraint is a load spinning reserve limit.

8. The system of claim 1, wherein said constraint is a market participant non-spinning reserve limit.

9. The system of claim 1, wherein said constraint is a market participant capacity limit.

10. The system of claim 1, wherein said constraint is a load capacity limit.

11. A method for optimal dispatch of energy generation and energy load in an energy imbalance market of an energy distribution system separate from a bilateral energy trading market and a dedicated regulation function of the energy distribution system, the energy distribution system including an energy distribution region subdivided into a plurality of different control areas including imbalance market participants, the method comprising:

receiving from a plurality of imbalance market participants, including energy generation participants and energy consuming load participants in an energy distribution region, energy supply and energy demand requirements for imbalance energy in an energy imbalance market;

determining optimal dispatch of energy generation and energy load for each imbalance market participant for balancing generation and load imbalances in the imbalance market responsive to security constraints of at least one imbalance market participant, wherein determining optimal dispatch is based on a direct current line transmission security constraint according to the relationship:

$$Pow_{line}^{base} + \sum_{unit \in G} SF_{line;\ unit} \cdot (En_{unit}^t - En_{unit}^{base}) - \sum_{load \in L} SF_{line;\ load} \cdot (En_{load}^t - En_{load}^{base}),$$

wherein $Pow_{line}^{base}$ is a power line base flow, unit is one of a group of energy generators G, $SF_{line;unit}$ is a shift factor for the unit on the line, $En_{unit}^t$ is the unit energy for time interval t, $En_{unit}^{base}$ is the unit base energy, load is one of a group of energy loads L, $SF_{line;load}$ is a shift factor for the load on the line, $En_{load}^t$ is the load energy for the time interval t, and $En_{load}^{base}$ is the load base energy; and generating balancing dispatch instructions responsive to the determined optimal dispatch of energy generation and energy load for each imbalance market participant for use in controlling their respective energy generation and energy load to remedy energy generation and energy load imbalances in the imbalance market other than the use of a bilateral energy trading market and a dedicated regulation function of the energy distribution system.

* * * * *